Oct. 31, 1961    R. KACOWSKI    3,006,252
MIRROR
Filed June 8, 1959
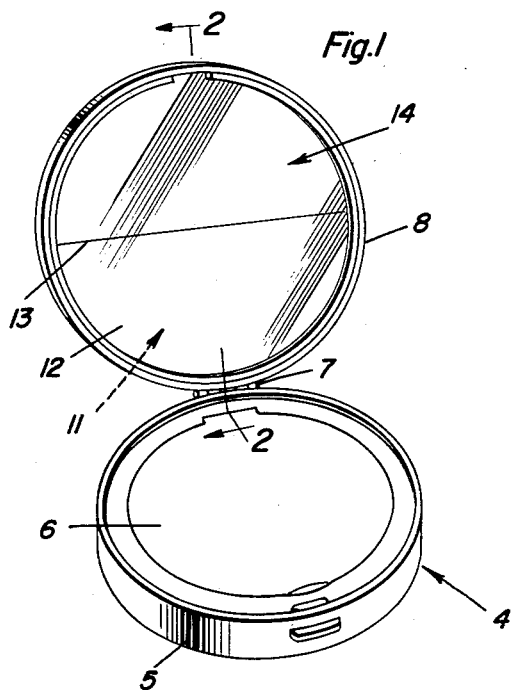
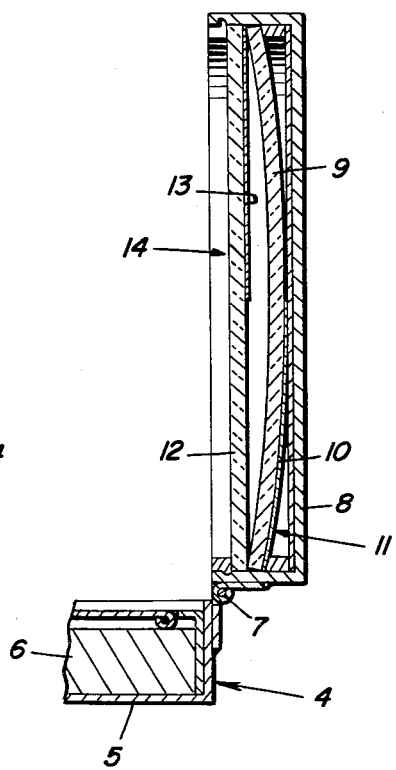
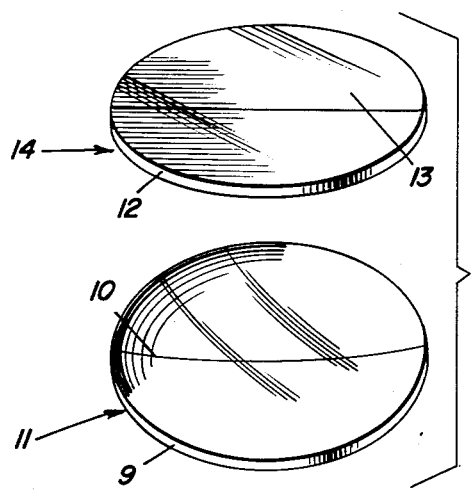
Raimund Kacowski
INVENTOR.

United States Patent Office 3,006,252
Patented Oct. 31, 1961

3,006,252
MIRROR
Raimund Kacowski, 443 St. Patrick St. W., Magog,
Quebec, Canada
Filed June 8, 1959, Ser. No. 818,850
2 Claims. (Cl. 88—85)

The present invention relates to new and useful improvements in mirrors particularly although by no means necessarily, for cosmetic powder compacts, and has for its primary object to provide, in a manner as hereinafter set forth, a device of this character comprising both plane or normal and magnifying or enlarging reflecting surfaces.

Other objects of the invention are to provide a combination plane and magnifying mirror of the aforementioned character which will be of relatively simple construction, durable, compact, of light weight, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

FIGURE 1 is a perspective view, showing a cosmetic powder compact equipped with a double vision mirror constructed in accordance with the present invention;

FIGURE 2 is an enlarged view in vertical section, taken substantially on the line 2—2 of FIGURE 1; and FIGURE 3 is a perspective view, showing the components of the mirror separated.

Referring now to the drawing in detail, it will be seen that reference character 4 designates generally a conventional cosmetic powder compact. The compact 4 includes the usual circular container or receptacle 5 for the reception of the face powder, as indicated at 6. Pivotally secured by a hinge 7 on the container 5 is a generally cup-shaped cover 8.

Mounted in the cover 8 is a substantially concavo-convex rear or inner disk or plate 9 of glass or other suitable transparent material. In the embodiment shown, the lower half of the disk or plate 9 is silvered on the back thereof, as indicated at 10, to provide an enlarging or magnifying mirror 11.

Also mounted in the compact cover 8 and superimposed on the marginal portion of the rear disk 9 on the concave side thereof is a flat or plane front disk or plate 12 of glass or other suitable transparent material. The upper half of the back of the front disk 12 is silvered, as indicated at 13, for providing a plane or natural mirror which is designated generally by reference character 14.

It is thought that the use of the invention will be readily apparent from a consideration of the foregoing. Briefly, when a natural or plane mirror is desired, the user observes the image or reflection in the silvered upper section of the front glass 12. For an enlarged image, the silvered lower section of the rear glass 9 is observed through the clear lower half of the front glass 12. Of course, the magnifying capacity of the mirror 11 is determined by the degree of curvature of the disk 9. Obviously, the disks or plates 9 and 12 may be of any suitable dimensions. Also, any desired portions of the glass disks or plates 9 and 12 other than 50% thereof, as shown, may be silvered to function as mirrors. Thus, one-quarter, for example, of the front glass 12 may be silvered, in which event the three quarters of the area of the rear glass 9 which is exposed by the clear portion of said front glass 12 will be silvered. While the mirror of the present invention has been shown incorporated in the cover of a cosmetic powder compact, any other suitable frame or support may be utilized for holding the assembly. The construction and arrangement of parts is such that the components of the invention may be produced and assembled at relatively low cost.

It is believed that the many advantages of a double vision mirror constructed in accordance with the present invention will be readily understood and although a preferred embodiment is as illustrated and described, it is to be understood that changes in the details of construction and in the combination and arrangement of parts may be resorted to, which will fall within the scope of the invention as claimed.

What is claimed as new is as follows:

1. A reflecting mirror comprising a generally concavo-convex, transparent inner disk having a silver coating on a portion of its convex side for providing a magnifying mirror, a flat, transparent outer disk fixedly superimposed on the marginal portion of the concave side of said inner disk and having a silver coating on a portion of its back corresponding to and aligned with the uncoated portion of the inner disk and providing a plane mirror, the uncoated portion of said flat disk being aligned with and corresponding to the coated portion of the inner disk and being clear for exposing the magnifying mirror, and a frame for the disks.

2. A reflecting mirror comprising an annular holder, a substantially concavo-convex, transparent rear disk mounted in said holder and having one-half of the area of its convex side silver-coated for providing a segmental magnifying mirror, and a flat, transparent front disk mounted in the holder and superimposed on the marginal portion of the rear disk on the concave side thereof and having one-half of the area of its rear side silver-coated for providing a segmental plane mirror, the other half of said front disk being clear and in registry with the magnifying mirror for exposing same.

References Cited in the file of this patent
UNITED STATES PATENTS

| | | |
|---|---|---|
| 1,114,559 | Weed | Oct. 20, 1914 |
| 1,651,836 | Rangel | Dec. 6, 1927 |
| 2,780,960 | Miller | Feb. 12, 1957 |